United States Patent [19]

Loeffler et al.

[11] Patent Number: 4,793,378
[45] Date of Patent: Dec. 27, 1988

[54] INTERLOCK VALVE AND CONTROL

[75] Inventors: John M. Loeffler, Toledo, Ohio; Rick D. Watson, Lambertville, Mich.; George F. Schetter, Toledo, Ohio

[73] Assignee: Dana Corporation, Toledo, Ohio

[21] Appl. No.: 54,077

[22] Filed: May 21, 1987

Related U.S. Application Data

[63] Continuation of Ser. No. 893,593, Aug. 6, 1986, abandoned.

[51] Int. Cl.$^4$ ............................................. F15B 13/042
[52] U.S. Cl. ....................................... 137/560; 74/477; 74/745; 137/625.25; 137/625.66
[58] Field of Search ................................. 74/477, 745; 137/625.25, 625.66, 560

[56] References Cited

U.S. PATENT DOCUMENTS

| | | | |
|---|---|---|---|
| 3,215,163 | 11/1965 | Henderson | 137/625.66 X |
| 3,227,180 | 1/1966 | Tissot-DuPont | 137/625.66 |
| 3,229,551 | 1/1966 | Stuckey . | |
| 3,393,586 | 7/1968 | Zundel . | |
| 3,556,151 | 1/1971 | Masuda | 137/625.25 X |
| 3,587,647 | 6/1971 | Walters | 137/625.25 |
| 4,445,393 | 5/1984 | Braun . | |
| 4,448,094 | 5/1984 | Yarnell . | |
| 4,450,869 | 5/1984 | Acker | 137/625.66 X |
| 4,550,627 | 11/1985 | Lauer et al. | 74/477 X |

FOREIGN PATENT DOCUMENTS

| | | | |
|---|---|---|---|
| 1150454 | 1/1958 | France | 137/625.66 |
| 426409 | 6/1967 | Switzerland | 137/625.66 |

*Primary Examiner*—Gerald A. Michalsky
*Attorney, Agent, or Firm*—MacMillan, Sobanski & Todd

[57] ABSTRACT

A four way two position interlock air valve adapted to selectively provide air pressure to a servomotor to shift the range section of a transmission. The valve spool is moved by applying pressure to one end thereof while exhausting pressure from the other. The upper side of the spool has a recessed portion within which a valve slide is positioned. The slide is operative to provide communication between a pressurized inlet port and the one of two outlet ports connected to the servomotor depending on the position of the valve spool. The slide is urged upwardly against the inner surface of the valve body by a wave spring. The area of the upper side of the slide is smaller than the area of the lower side thereof and an aperture connects the two sides such that air pressure controlled thereby also urges the slide upwardly against the valve body. The bottom side of the spool has four shoulders formed thereon to interlock with transmission shift rail actuated locking pins at such time as any of said rails is out of its neutral position. When so interlocked, the valve spool cannot be moved.

4 Claims, 3 Drawing Sheets

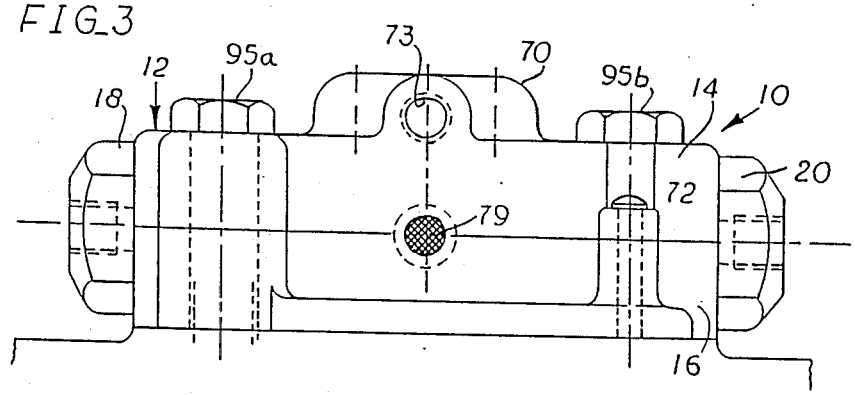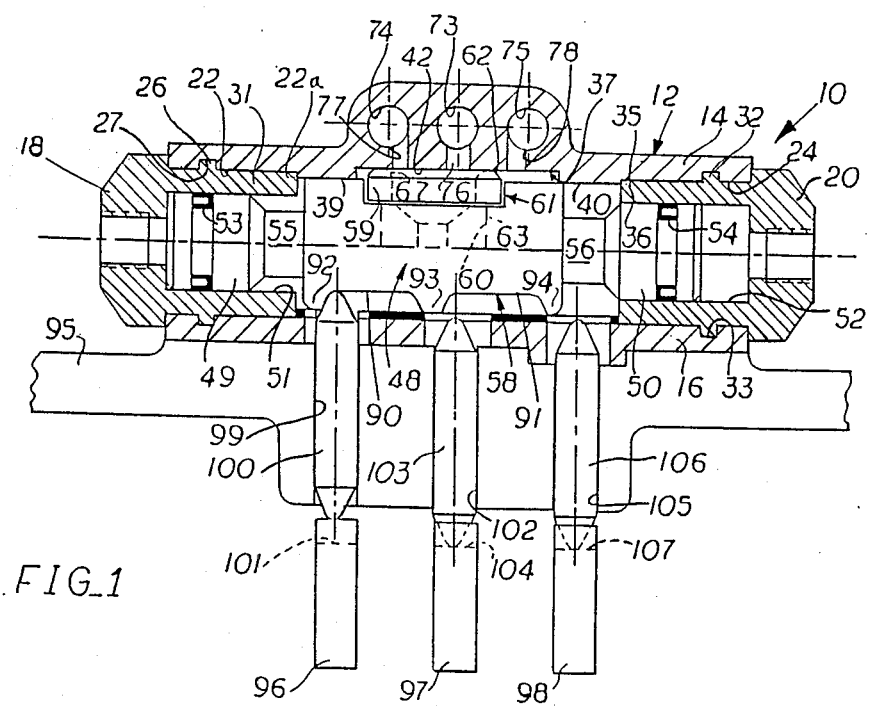

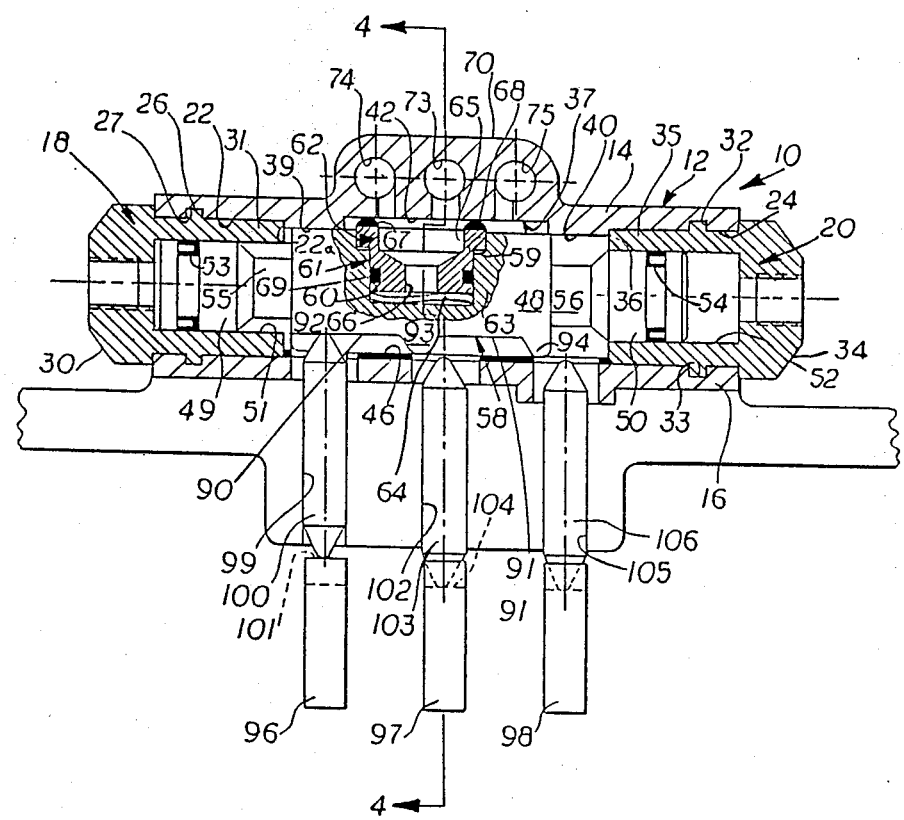
FIG_2

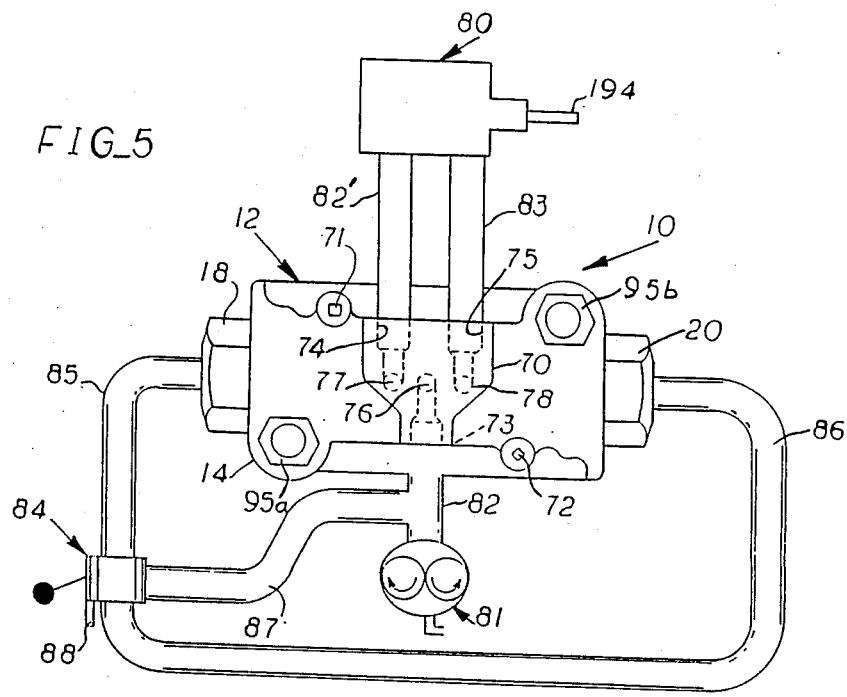
FIG_5
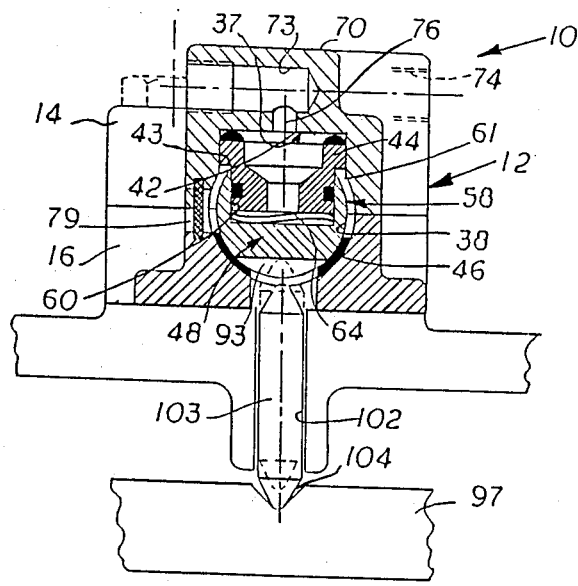
FIG_4

INTERLOCK VALVE AND CONTROL

CROSS REFERENCE TO RELATED APPLICATION

This application is a continuation of co-pending application Ser. No. 06/893,593, filed Aug. 6, 1986, now abandoned.

BACKGROUND OF THE INVENTION

1. Field of the Invention

The present invention relates to a four way, two position, mechanically interlock air valve and more particularly to such a valve adapted in response to pilot air signals to shift its piston position and thereby to selectively provide air pressure to shift the range section of a vehicle transmission at such times as the main section of the transmission is in neutral and which shifting air pressure assists in sealing the valve.

2. Description of the Prior Art

U.S. Pat. No. 3,229,551 to Stuckey discloses a shifting mechanism including an interlock valve, as does U.S. Pat. Nos. 3,393,586 to Zundel; 4,445,393 to Braun, 4,448,094 to Yarnell and 4,550,627 to Lauer et al. However none of these patents disclose a separate locking pin corresponding to each of the main shift rails of the transmission to lock the valve spool in position when one of the main shift rails is moved out of a neutral position. Additionally the valve spool of the present invention has a valve slide retained in the valve spool and such does not appear to be disclosed in the prior art.

SUMMARY OF THE INVENTION

The present invention relates to a four way, two position mechanically interlocked air valve adapted to selectively provide air pressure to shift the range section of a vehicle transmission. The valve has a generally cylindrical spool which is axially shiftable within a valve body upon the imposition on the alternate ends thereof of pilot or shifting air pressure while exhausting the air pressure from the opposite end of the spool. The upper side of the spool is provided with a central recessed location within which a slide is maintained. The slide has an air passage therein and is adapted to provide comunication between an inlet port connected to a source of pressurized air and one of two outlet parts connected to the shift mechanism of the range section; the particular outlet port which is connected depends upon the position of the slide. The slide is urged upwardly against the inner surface of the valve body containing the inlet and outlet ports by means of spring means in the form of a wave washer compressed between the bottom of the slide and the adjoining valve spool. Additionally, an air passageway is formed through the slide from the smaller area upper side of the slide to the larger area lower side of the slide so that the air pressure controlled by the slide also urges the slide upwardly into sealing engagement with the inner surface of the valve body containing the inlet and outlet ports. The bottom side of the spool is formed with four recessed areas which cooperate with three vertical locking pins extending through the valve bottom. The pins are actuated by movement of the shift rod associated therewith to be moved upwardly into one of the recesses when the particular shift rod is moved out of its neutral position. When moved upwardly, the pin locks the spool in position so that it cannot be moved until all three of the shift rods are moved to the neutral position, allowing all three of the pins to drop downwardly out of engagement with the spool.

BRIEF DESCRIPTION OF THE DRAWINGS

For a fuller understanding of the nature and objects of the invention, reference should be made to the following detailed description taken in connection with the accompanying drawings, in which:

FIG. 1 is a longitudinal view, partially in cross section of the valve of this invention shown in conjunction with a fragment of the transmission housing and three shift rails, which are disposed in the housing. The valve spool and the valve slide are shown in full lines.

FIG. 2 is a view according to FIG. 1 with the central portion of the valve spool broken away and the valve slide shown in longitudinal cross section; the adjacent broken-away portion of the valve spool is also shown in cross section.

FIG. 3 is a longitudinal view of the valve of FIGS. 1 and 2, shown in full lines, and shown in conjunction with a fragment of the transmission housing.

FIG. 4 is a cross sectional view taken along the lines 4—4 in FIG. 2; the line 2—2 being displaced along its path to go through the center of the valve slide; and FIG. 5 is a plan view of the valve of FIG. 1 with the inlet port of pressurized air and the two alternate outlet ports shown in phantom lines, and with the control circuit and the controlled range shifting servomotor shown diagramatically.

DETAILED DESCRIPTION OF A PREFERRED EMBODIMENT

Referring now to the drawings a four way, two position interlock and control valve is shown generally at 10 and includes a valve body 12 split longitudinally at its horizontal midsection into upper and lower sections 14 and 16 respectively. The left end of the valve body 12 has secured therein a plug 18 while the right end of the body 12 has secured therein a plug 20.

More particularly the valve body 12 has a pair of opposed cylindrical bores therein; a bore 22 at the left end thereof and a bore 24 at the right end thereof. The plugs 18 and 20 each extend approximately one-fourth of the length of the valve body 12 into the bore thereof. The left plug 18 has a cylindrical shoulder 26 thereon intermediate the ends thereof, which shoulder is securely received in a mating groove 28 formed in the cylindrical bore 22. The shoulder 26 and an enlarged left hexagonal end 30 of the plug 18, which end 30 abuts the left side of upper and lower sections 14 and 16, position the plug relative to the valve body. The right end of 31 of the plug 18 is adjacent to a shoulder 22a which forms the right end of the bore 22. The plug 18 is inserted in the valve body 12 during assembly when the upper and lower sections 14 and 16 of the valve body are separated and then secured when the sections 14 and 16 are secured to each other as hereinafter described.

The right plug 20 has a cylindrical shoulder 32 thereon intermediate the ends thereof, which shoulder is sealingly and securely received in a mating groove 33 formed in the cylindrical bore 24. The shoulder 32 and an enlarged right hexagonal end 34 of the right plug 20, which end 34 abuts the right side of the upper and lower sections 14 and 16, position and seal the plug relative to the valve body. The left end 35 of the plug 20 is adjacent to a shoulder 36 which forms the left end of the bore 24. The right plug 20 is inserted during assembly of the upper and lower sections as described above regarding the plug 18.

The middle portion of 37 the valve body 12 between the shoulders 22a and 36 is not entirely cylindrical as are the bores 22 and 24. The left and right ends 39 and 40, respectively of the medial portion 37 are cylindrical, while the center portion inbetween the ends 39 and 40 and indicated by the numeral 37 is partly cylindrical and partly rectangular (rectangular when viewed in either longitudinal or transverse cross section).

Referring to FIG. 4, wherein the medial portion 37 of the bore of the valve body 12 between the shoulders 22 and 36 is seen in cross section, it is seen that the lower two-thirds (approximately 240 degrees) portion of the bore is of cylindrical shape as shown at 38. A front and a back wall 43 and 44 respectively extend upwardly from the cylindrical portion 38. A transverse wall 42 extends laterally and horizontally to connect the front and back walls. The size of the space between the walls 42, 43 and 44 is such that if the cylindrical portion 38 were continued it would lie within the space defined by the walls 42, 43 and 44. The lower one-third of the medial portion 37 has a bushing 46 disposed therein to provide a low friction sliding surface. The radius of the bushing 46 and the axis thereof is the same as that of the left and right ends 39 and 40 of medial portion 37.

Disposed in the central bores of the valve body 12 is a valve spool shown generally at 48, which spool has a pair of opposed cylindrical pistons 49 and 50 abuttingly positioned at the left and right end thereof, respectively, with the piston 49 being slidingly received in a cylindrical bore 51 formed in the left plug 18 and the piston 50 being slidingly received in a cylindrical bore 52 formed in the right plug 20. The pistons 49 and 50 are formed separately from the valve spool 48 and abut the opposed ends thereof. A sealing ring 53 is received in the piston 49 and a sealing ring 54 is received in the piston 50 to seal the pistons 49 and 50 against the bores 51 and 52 respectively. Necked down portions 55 and 56 respectively of the pistons 49 and 50 abut and push against the central portion 58 of the valve spool 48.

The central portion 58 has a diameter which is the same as the diameter of the left and right ends 39 and 40 of the medial portion 37. As seen in FIGS. 1, 4 and 5, at a location intermediate the ends of the spool 48, the spool is provided with a pair of coaxial radially downwardly extending bores 59 and 60 with the bore 59 being the radially outer bore and larger in diameter than the coaxial radially inner bore 60.

Closely received in the bores 59 and 60 is a valve slide 61; which slide has an upper enlarged portion 62 and a lower smaller portion 63, the enlarged portion 62 fitting in the outer bore 59 and extending radially therefrom and the smaller portion 63 fitting in the inner bore 60. An "O-ring" 69 is fitted in the periphery of the smaller portion 63 and sealingly and slidingly engages the bore 60. Disposed between the bottom of the lower smaller portion 63 and the bottom of the bore 60 is a resilient means in the form of a wave washer 64 which biases the valve slide 61 radially outwardly.

As clearly seen in FIG. 2, the slide 61 has a large bore 65 formed in the enlarged portion 62 confluently with a smaller bore 66 formed in the smaller portion of the slide. As a result of the bore 65 in the enlarged portion 62, the upper end of the enlarged portion terminates in an annular lip 67 which has an elastomeric sealing face 68 thereon. The sealing face 68 sealingly and slidingly engaging the center portion 42 of the medial portion 37 of the bore of the valve body.

The upper 14 and lower 16 portions of the valve body 12 are assembled after the plugs 18 and 20 and the valve spool 48 have been disposed therebetween and are conventionally secured together by a pair of screws 71 and 72 which pass through the upper portion 14 and screw into the lower portion 16.

The upper section 14 of the valve body has an enlarged central boss 70 which boss lies over the center portion 42 and has three openings therein which extend transversely with respect to the axis of the valve spool 48; a central opening 73 which extends upwardly as seen in FIG. 5 or to the right as seen in FIG. 4 and into the paper as seen in FIGS. 1, 2 and 3; a left opening 74 and a right opening 75 on either side of the opening 73 and extending in the opposite direction of the opening 73. The openings 73, 74 and 75 extend slightly past the center of the boss 70 and are respectively confluent with radially downwardly extending central opening 76 (See FIGS. 1 and 5 for numerals) downward extending left opening 77 and downward extending right opening 78; which downward extending openings open through the central portion 42 and into the bore of the valve body 12.

When the valve spool 48 is moved to its full left position, as seen in FIGS. 1 and 2, the large bore 65 in the valve slide 61 joins the openings 76 and 77 and thereby the openings 73 and 74 in a confluent relationship; while the opening 78, and through the latter the opening 75, is confluent with the right side of the central portion 42 and through the same to a filtered vent opening 79 (see FIGS. 3 and 4) in the valve body to vent the openings 75 and 78. Conversely, when the valve spool 48 is moved to its full right position, the large bore 65 in the valve slide 61 joins the openings 76 and 78 and thereby the openings 73 and 75 in a confluent relationship; while the opening 77 and through the latter the opening 74, is confluent with the left side of the portion 42 and through the same to the filtered vent opening 79 to vent the openings 74 and 77.

The valve 10 is adapted to control a well known servomotor 80 which is of the conventional type for shifting the range shift of transmission such as exemplified by the servomotor and range shift seen in U.S. Pat. No. 3,229,551. When the piston rod 194 of servomotor 80 is moved to the right, the range section of the transmission (not shown) will be in high range, while when the piston rod 194 of the servomotor 80 is moved to the left, the range section of the transmission (not shown) will be in low range.

A truck mounted pump 81 is provided to actuate the servomotor. More particularly a line 82 from the pump to the opening 73 provides a constant source of pressure to the opening 76, and, depending upon which way the valve spool 48 is positioned either to the left to bring the openings 77 and 74 confluent to opening 76 and through a line 82' to the left side of the servomotor 80 to move the piston 194 to the right, or if the spool is positioned to the right to bring the openings 76 and 78 into confluence and through a line 83 to the right side of the servomotor 80 to move the piston 194 to the left.

Since opening 76 is always connected to the pump 81, whether the valve spool 48 is left or right, pressure is always supplied to the valve slide 61 therethrough. Pressure reaching the valve side passes through bores 65 and 66 so as to simultaneously act upon the top and the bottom of the slide 61. The area of the top of the slide 61 is smaller than the area of the bottom of the slide, so that the pressure differential urges the slide 61 upwardly against the portion 42 and assists the wave washer 64 provide a seal between the lip 67 of the slide 61 and the portion 42.

Control means are provided to provide pilot air to move the valve spool 48 to the left and right. More particularly a conventional shift control valve 84 has a first line 85 confluently connected to the left plug 18 and a second line 86 confluently connected to the right plug 20. A third line 87 connects the valve 84 in confluent relationship with the pump 81, while a line 88 provides a vent for the valve 84. When the valve handle is downward, as seen in FIG. 5, the line 85 is vented and the line 86 is charged thereby applying pressure to the right side of valve spool 48 and venting pressure, through vent line 88. When the valve handle is moved upwardly, from the position seen in FIG. 5, the line 86 is vented through line 88 and the line 85 is charged thereby applying pressure to the left side of valve spool 48 and moving the same to the right.

Mechanical means are provided to interlock the valve spool 48 with the shift rods in the associated transmission to prevent movement of the valve spool 48 and thereby actuation of the servomotor 80 at such times as the transmission is not in neutral.

More particularly, the valve spool 48 is provided with 4 recesses; the outer two recesses being formed by the necked down portions 55 and 56 and the inner two being chordally formed recesses in the central portion 58 of the spool at the bottom thereof as shown at 90 on the left and 91 on the right. The four recesses 55, 56, 90 and 91 formed three blocking shoulders therebetween a left shoulder 92, a middle shoulder 93 and a right shoulder 94.

The valve body 12 is secured to the transmission 95 by a pair of diametrically opposed bolts 95a and 95b such that the valve spool 48 is disposed transversely to the axis of the transmission shift rails; left rail 96, center rail 97 and right rail 98, which rails are conventionally carried by the case of the transmission 95 and carry the conventional shift forks to shift the transmission gears in a conventional manner, such as the shift rails and forks seen in U.S. Pat. No. 3,229,551.

With the valve spool 48 disposed in its leftward position a left bore 99 is formed in the case of the transmission 95 and the adjoining lower section 16 of the valve body 12 such that the upper tapered end of a vertically extending left blocking pin 100 when in its upper position, will engage the right side of the shoulder 92 as seen in FIGS. 1 and 2 thereby inhibiting the piloting shifting of the valve spool to the right. The blocking pin 100 will be in its upper position, whenever shift rail 96 is other than in its neutral position; however, when the rail 96 moves to its neutral position, the blocking pin 100 will fall downwardly into a notch 101 formed in the rail.

If the valve spool 48 was in its rightward position and the shift rail 96 out of its neutral postion, the upper end of the blocking pin 100 would engage the left side of the shoulder 92, thereby inhibiting the piloting shifting thereof to the left.

Again, with the valve spool 48 disposed in its leftward position, a middle bore 102 is formed in the case of the transmission 95 and the lower section 16 of the valve body 12 such that the upper tapered end of a vertically extending middle blocking pin 103, would in its upper position, engage the right side of the shoulder 93. As seen in FIGS. 1, 2 and 4, the shift rail 97 is in its neutral position and the middle blocking pin 103 is disposed in the neutral notch 104 in rail 97, and does not engage the shoulder 93. FIG. 4 shows in phantom lines the upper position of the middle block pin 164 engaging shoulder 93 when the shift rod 97 moves from its neutral position.

If the valve spool 48 was in its rightward position, the upper end of the blocking pin 103 would be positioned to engage the left side of the middle shoulder 93 and thereby inhibit the piloting shifting thereof to the left.

Further, with the valve spool 48 disposed in its leftward position, a right bore 105 is formed in the case of the transmission 95 and the lower section 16 of the valve body 12 such that the upper blocking end of a vertically extending right blocking pin 106, would in its upper position, engage the right side of the shoulder 94. As seen in FIGS. 1 and 2, the shift rail 98 is in its neutral position and the right blocking pin 106 is disposed in the neutral notch 107 in the rail 98 and does not engage the shoulder 94. If the rod 98 moves from its neutral position (the other two rods would have to be first neutralized) the rod 106 would move upwardly and engage the right side of shoulder 94.

If the valve spool 48 was in its rightward position, the upper end of blocking pin 106 would be positioned to engage the left side of the right shoulder 94 upon movement of the rail 98 from its neutral position and thereby inhibit piloting shifting thereof to the left.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. In a transmission having a fluid pressure actuated means for shifting a range shift section of the transmission and having a plurality of movable shift rails, a valve for selectively connecting an input line communicating with a source of pressurized fluid to one of two output lines communicating with the shifting means for shifting the range shift section comprising:

a valve body secured to the transmission having an inlet port formed therein connected to the input line, a pair of outlet ports formed therein respectively connected to the output lines, and a chamber formed in said valve body;

a valve spool disposed in said valve body chamber, said valve spool being movable between a first position, wherein communication is provided between said inlet port and one of said outlet ports, and a second position, wherein communication is provided between said inlet port and the other of said outlet ports;

a plurality of recesses formed in said valve spool defining respective shoulders between adjacent pair of said recesses; and individual rod means cooperating with each of the shift rails, each of said individual rod means adapted to extend through said valve body into one of said recesses only when its associated shift rail is not in a neutral position.

2. The invention defined in claim 1 wherein each of said individual rod means includes a blocking pin extending through a respective bore formed in the transmission, a first end of each of said blocking pins engaging its associated shift rail and a second end of each of said blocking pins being selectively movable into one of said recesses so as to block said movement of said valve spool by engagement with one of said shoulders.

3. The invention defined in claim 2 wherein each of the shift rails includes a notch formed therein adapted to be engaged by said associated blocking pin when the shift rail is in a neutral position, whereby said associated blocking pin is moved out of said recesses.

4. The invention defined in claim 3 wherein said valve spool is disposed such that the axis of movement thereof between said first and second positions is perpendicular to the axes of movement of the shift rails.

* * * * *